(12) United States Patent
Tzoganakis

(10) Patent No.: US 7,189,762 B2
(45) Date of Patent: Mar. 13, 2007

(54) METHOD OF MODIFYING CROSSLINKED RUBBER

(76) Inventor: Costas Tzoganakis, 200 University Avenue West, Waterloo, Ontario N2L 3G1 (CA)

( * ) Notice: Subject to any disclaimer, the term of this patent is extended or adjusted under 35 U.S.C. 154(b) by 244 days.

(21) Appl. No.: 10/261,680

(22) Filed: Oct. 2, 2002

(65) Prior Publication Data

US 2003/0125401 A1 Jul. 3, 2003

(30) Foreign Application Priority Data

Oct. 2, 2001 (CA) .................................. 2358143

(51) Int. Cl.
*C08J 11/16* (2006.01)
(52) U.S. Cl. ..................... 521/41; 521/40.5; 521/44.5
(58) Field of Classification Search ................ 521/40, 521/40.5, 41, 44.5
See application file for complete search history.

(56) References Cited

U.S. PATENT DOCUMENTS

| 2,461,192 | A |   | 2/1949 | Banbury et al. ............... 260/5 |
| 2,966,468 | A |   | 12/1960 | Dasher ........................ 260/2.3 |
| 3,460,769 | A |   | 8/1969 | Merges ........................ 241/17 |
| 4,146,508 | A |   | 3/1979 | Maxwell ...................... 260/2.3 |
| 4,813,614 | A | * | 3/1989 | Moore et al. .................. 241/3 |
| 5,418,256 | A |   | 5/1995 | Dhawan et al. ............. 521/41.5 |
| 5,658,657 | A | * | 8/1997 | Tomizawa et al. .......... 428/323 |
| 5,883,140 | A |   | 3/1999 | Fisher et al. ................ 521/45.5 |
| 6,369,192 | B1 | * | 4/2002 | Dufresne et al. ............ 528/483 |
| 6,426,136 | B1 | * | 7/2002 | Rouse et al. ................. 428/327 |
| 6,663,954 | B2 | * | 12/2003 | Rouse et al. ................. 428/327 |
| 6,680,110 | B1 | * | 1/2004 | Deeb et al. .................. 428/327 |

FOREIGN PATENT DOCUMENTS

| DE | 211 575 |   | 7/1984 |
| EP | 0 074 344 |   | 3/1983 |
| JP | 08291228 | A * | 11/1996 |
| JP | 11293022 | A * | 10/1999 |
| SU | 1 717 381 |   | 6/1987 |

OTHER PUBLICATIONS

Yamashita, S., "Reclaimed Rubber from Rubber Scrap (2)." *International Polymer Science and Technology*, vol. 8, No. 12, 1981, pp. T77-T93.

* cited by examiner

*Primary Examiner*—Tae H Yoon
(74) *Attorney, Agent, or Firm*—Blank Rome LLP

(57) ABSTRACT

A method of modifying crosslinked rubber comprising subjecting the rubber to mechanical elongational and shear forces in the presence of a supercritical fluid that is normally gaseous. Controllable devulcanization of the rubber is achieved.

23 Claims, 6 Drawing Sheets

METHOD OF MODIFYING CROSSLINKED RUBBER

FIELD OF THE INVENTION

The invention relates to modifying crosslined rubbers by mechanical treatment.

BACKGROUND OF THE INVENTION

There are known procedures for devulcanizing crosslinked polymers, but known procedures are not as effective or as easily controllable as may be desired.

SUMMARY OF THE INVENTION

The present invention relates to a method of modifying crosslinked rubber comprising subjecting the rubber to mechanical elongational and shear forces in the presence of a supercritical fluid that is normally gaseous.

It has been found that by application of the above method modified rubber can be obtained. More particularly, a devulcanized rubber can be obtained.

The term "supercritical" in the present specification is used in its ordinary meaning as referring to a fluid that is adjacent or above the critical temperature and pressure. The fluid may be somewhat below the critical temperature and pressure, for example at least, but not limited to 90% the critical pressure and at least, but not limited to 90% the critical temperature expressed in ° K.

In the preferred form, the fluid is at a pressure from about 90 to about 300% of its critical pressure and at a temperature expressed in ° K of about 90% to about 300% of its critical temperature.

By "normally gaseous" is meant a fluid that is a gas at standard temperature and pressure i.e. at 273° K and one atmosphere (100 kPa or 14.7 psi).

While it is contemplated that various normally gaseous fluids may be employed, such as ethane, ethene, propane, propene, xenon, nitrogen, ammonia, nitrous oxide or fluoroform, a preferred fluid is carbon dioxide.

In the preferred form, the ratio by weight of rubber to the fluid constituting the supercritical fluid is in the range of about 100:1 to about 10:1, more preferably about 100:1 to about 20:1.

The content of the supercritical fluid in the mixture, based on the weight of the rubber is preferably about 0.5 to about 10%. With contents of supercritical fluid significantly less than about 0.5% by weight, the plasticity and flowability of the rubber may be insufficient with the result that application of elongational and shear forces may be difficult or impossible. Contents of supercritical fluid in excess of about 10% do not increase the plasticity and flowability of the rubber significantly above those achievable at lower contents, and merely increase the utilization of supercritical fluid and the operating costs. More preferably, the content of supercritical fluid is about 0.5 to about 5%, based on the weight of rubber, still more preferably about 1.5 to about 3%.

Preferably, the rubber is provided in finely divided form, for example at a particle size of 150 microns to about 5 mm. With larger particle sizes than about 5 mm, mechanical processing difficulties may tend to arise as a result of the persistence of unmasticated particles in the mix, while the use of particles significantly smaller than about 150 microns does not facilitate processing substantially as compared with the results obtained with larger particle sizes, and increases the materials costs because of the increased energy costs of comminution. More preferably, the rubber particle size is about 160 to about 1000 microns, still more preferably about 170 to about 500 microns.

The term "rubber", designating the crosslinked materials that may be modified and devulcanized in accordance with the present method, should be interpreted broadly, and as it would be understood by one skilled in the art, to include natural rubber and natural or synthetic polymers that have physical properties similar to natural rubber, such as elastic recovery from deformation, and mechanical strength. Examples of such materials include natural rubber, styrene-butadiene rubber, EPDM (ethylene-propylene diene rubbers), EPT (ethylene-propylene terpolymer rubbers), TPU (thermoplastic urethane rubbers), TPEs (thermoplastic elastomers), TPVs (thermoplastic vulcanizates), butyl rubber, nitrile rubber, polysulfide elastomers, polybutadiene, polyisoprene rubber, polyisobutylene, polyester rubbers, isoprene-butadiene copolymers, neoprene rubber, acrylic elastomers, diisocyanate-linked condensation elastomers, silicone rubbers, crosslinked polyethylene, ethylene-vinylacetate polymers, and mixtures thereof.

Various forms of apparatus useable for applying mechanical elongational and shear forces to crosslinked rubber material are known to those skilled in the art and may be modified to render them capable of pressurization by a supercritical fluid.

In the preferred form, the present invention employs an extruder, for example a twin screw extruder. Such extruders are known to apply mechanical elongation and shear forces to materials passing through them. The invention is, however, by no means limited to the use of extruders, and other pressurized apparatus known to those skilled in the art that apply mechanical elongation and shear forces may be employed.

The invention will be described in more detail, by way of example only, with reference to the accompanying drawings.

DESCRIPTION OF THE PREFERRED EMBODIMENT

While the above description provides ample information to enable one skilled in the art to carry out the invention, Examples of preferred methods will be described in detail without limitation of the scope of the invention.

EXAMPLE 1

Figure 1:
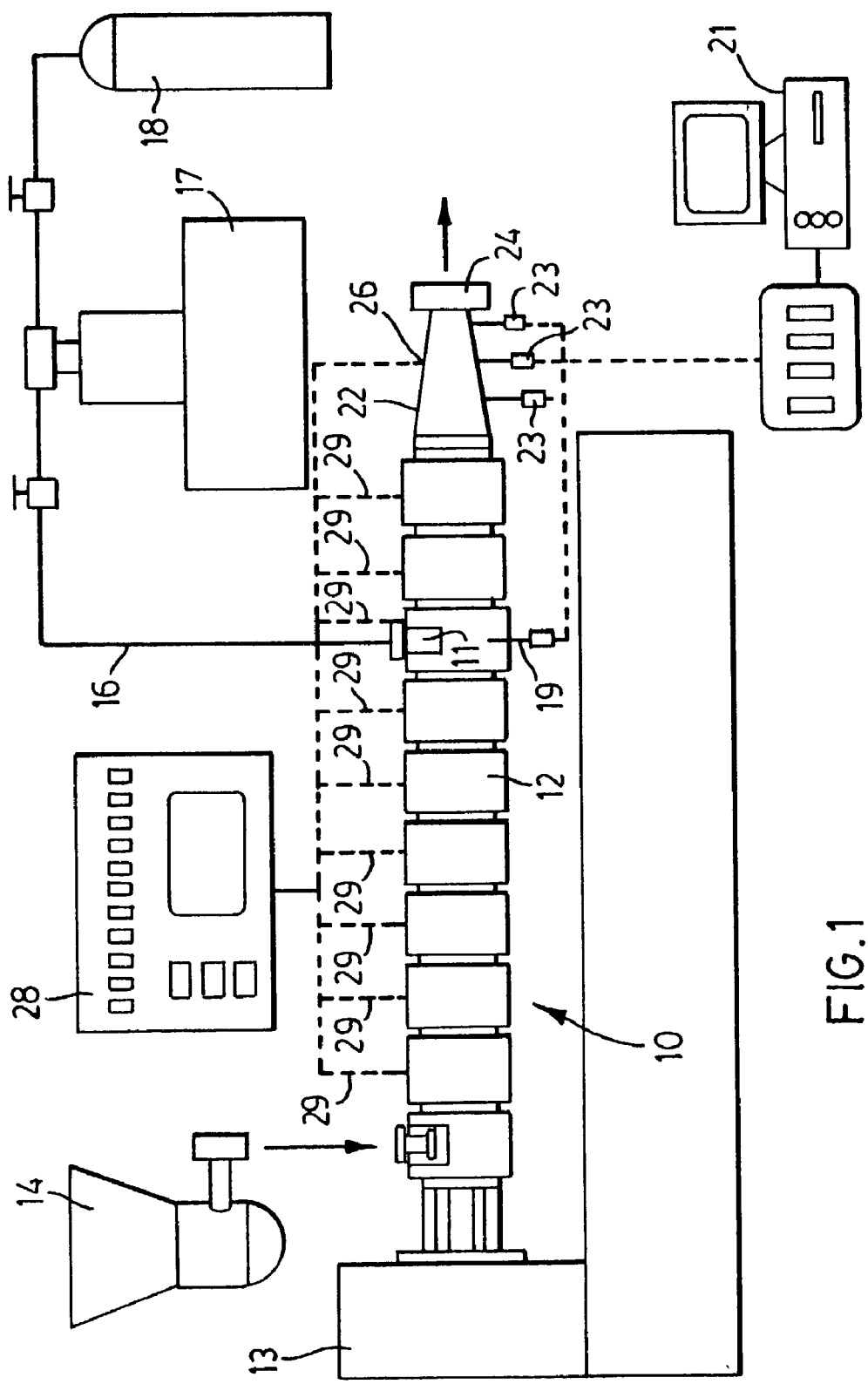
FIG. 1 shows a schematic diagram of a twin screw extrusion system.

In the present example, a twin-screw compounding extruder 10 as illustrated in FIG. 1 was used for the production of recycled rubber using a high pressure supercritical carbon dioxide injection system.

Figure 2:
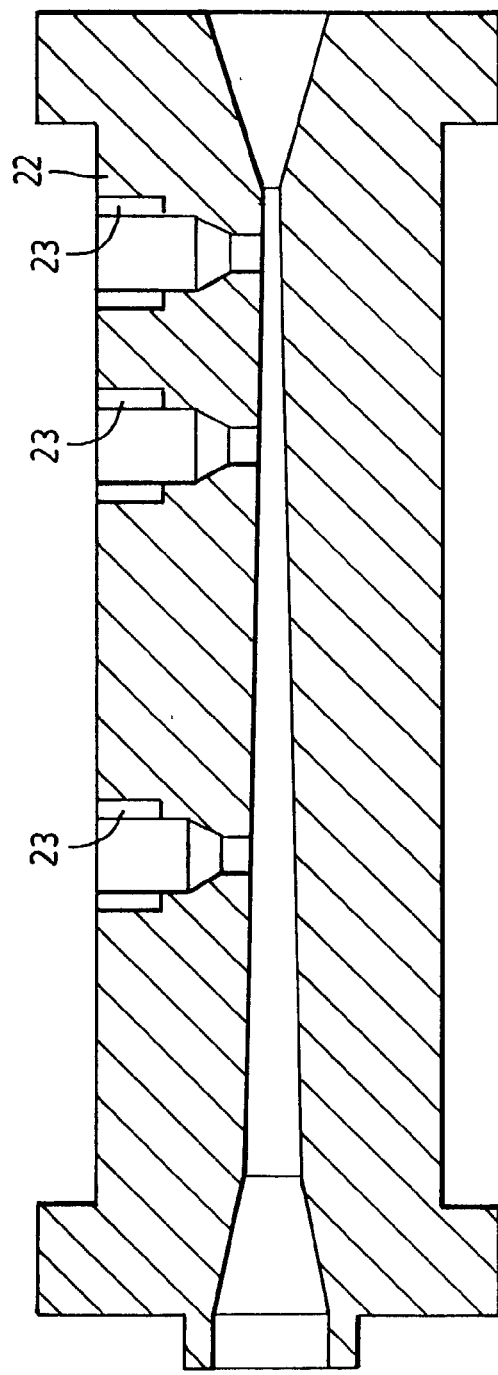
FIG. 2 shows a schematic diagram of a wedge die.

Two types of materials, fine powders (40–60 mesh) (250 microns to 420 micron particle size) and granules (4–8 mesh) (2.38 mm to 4.76 mm particle size), were obtained (ex Huronco, Huron Park, Ontario, Canada). They were processed at various temperatures and feed rates in the extruder 10 equipped with a gas injection port 11. The extruder used is a Leistritz LSM 30.34, intermeshing and co-rotating twin-screw machine having a 34 mm screw diameter operating in a barrel 12 and driven through a gear box 13. Rubber particles were fed by a K-Tron feeder 14 (LWFD 50200), and $CO_2$ was injected into the extruder along a line 16 through the injection port 11 on the barrel 12 using a positive displacement syringe pump 17 connected to a $CO_2$ cylinder 18. The pressure at the barrel injection port 11 was monitored by a pressure transducer 19 (Dynisco PT462-5M-6/18) connected to a data acquisition system 21. In order to measure the flowability (viscosity) of rubber/$CO_2$ mixtures, a wedge die 22 equipped with three other pressure transducers 23 (one Dynisco PT462-10M-6/18, two Dynisco PT462-7.5M-6/18) also connected to the system 21 was attached to the extruder 10. The pressures in the barrel 12 and in the wedge die 22 were manipulated by controlling the opening area of a secondary die 24 attached to the end of the wedge die 22. The temperature of the rubber/$CO_2$ mixtures was measured using a fiber optic melt temperature transducer 26 (Dynisco MTS 92206/24) at the end of the wedge die 22 and connected to a control panel 28. As is conventional, the barrel 12 is equipped with heating devices connected to and controlled from the control panel 28, to maintain the barrel at a desired temperature. The temperatures at various points along the length of the barrel 12 could be measured by thermocouples indicated by broken lines 29 in FIG. 1, also connected to the control panel 28. In this Example, the rubber feed rate was varied from 20 to 70 g/min. and a relatively low screw speed of 50 rpm was used in order to maintain the high pressure required and to minimize the heat generation in the barrel 12. A cross-section of the wedge die 22 is shown in FIG. 2.

Flowability (Viscosity) Measurements

The flowability (viscosity) of rubber and rubber/$CO_2$ mixtures was measured on the wedge die attached to extruder.

Tensile Tests

In order to investigate the tensile properties of the rubber, dumbbell specimens were prepared using a hot press at different pressurizing forces and temperatures. The pressurizing force was varied from 25000 psi to 35000 psi, and the temperature was changed from 150° C. to 250° C. The thickness of the specimens was varied due to the differences in elasticity. During the tensile test, the crosshead speed was controlled at 10 mm/min.

Screw Configuration

In order to produce foamed rubber materials, the dissolution of $CO_2$ into the rubber in a twin-screw extruder was performed. For that purpose, an optimum screw configuration was determined based on several design concepts:

(a) At the injection point of $CO_2$, pressure fluctuations inside the barrel are desirably minimized for a stable injection. Use of conveying screw elements is therefore preferable rather than that of kneading discs.

(b) Injected $CO_2$ is desirably to be prevented from leaking upstream. This may be achieved by a melt seal generated using a reverse conveying screw elements, for example.

(c) The pressure downstream of the $CO_2$ injection point is desirably maintained sufficiently high, to ensure that $CO_2$ remains dissolved in the polymer phase. The barrel pressure may be manipulated through the die resistance, for example.

(d) Although the mixing capability of a twin-screw extruder is much higher than that of a single-screw extruder, an array of kneading discs is desirably used to ensure complete dissolution of $CO_2$.

Figure 3:
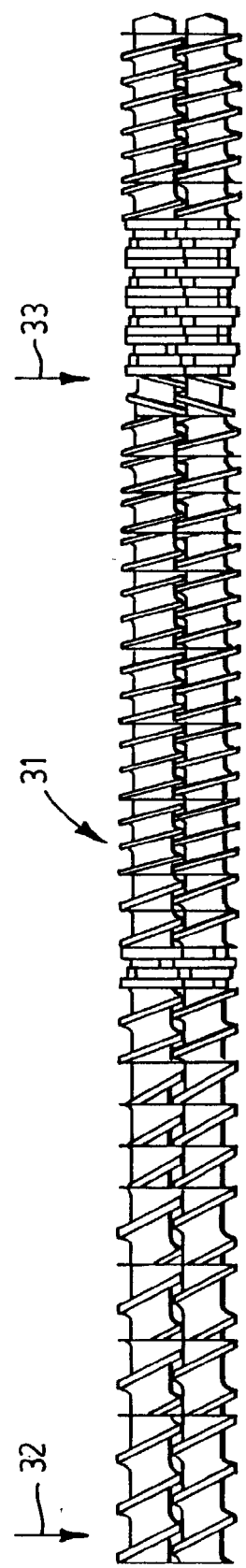
FIG. 3 shows a schematic diagram of a screw configuration.

One form of screw configuration 31 meeting these design requirements is shown in FIG. 3. The points of injection of the crosslinked polymer and of $CO_2$ are indicated at 32 and 33, respectively.

Extrusion Characteristic

Without $CO_2$ Injection

In the absence of $CO_2$, when the barrel temperature was varied from 200° C. to 280° C. in the range of feed rates from 20 to 70 g/min., regardless of screw speed, extrusion was impossible due to the overload of the motor. At the early stage of extrusion, the rubber particles fill the empty space between the screw and barrel. Motor amperage gradually increases continuously during this filling stage and it reaches the maximum safe operating value. The reasons for this overload appear to come mainly from the high viscosity and the crosslinked nature of the recycled rubber. In other words, extrusion of the recycled rubber was impossible under the conditions listed earlier.

With $CO_2$ Injection

The extrusion of rubber was successfully performed by injecting the supercritical $CO_2$. The designed screw configuration shown in FIG. 3 generates high pressure in the barrel in order to dissolve the injected $CO_2$. In this example, the injection of supercritical fluid greatly increases the flowability of rubber during extrusion. Operating conditions are shown in Table 1.

TABLE 1

Operating conditions in a twin screw extruder

| Operating Conditions | Values |
| --- | --- |
| Temperature (° C.) | 240–260 |
| Feed Rate (g/min) | 50–70 |
| Screw Speed (rpm) | 50 |
| $CO_2$ Concentration (wt %) | 2–3 |

The operation with fine powders (40–60 mesh) was found to be better than that with granules (4–8 mesh) for the die used in this Example. In the latter case, the die was blocked frequently by large unmasticated granules. Also, it should be noted that the extruded material could ignite under certain conditions (high temperatures) possibly due to partial devulcanization and ignition of plasticizers in the recycled rubber.

Viscosity Measurements

Figure 4:
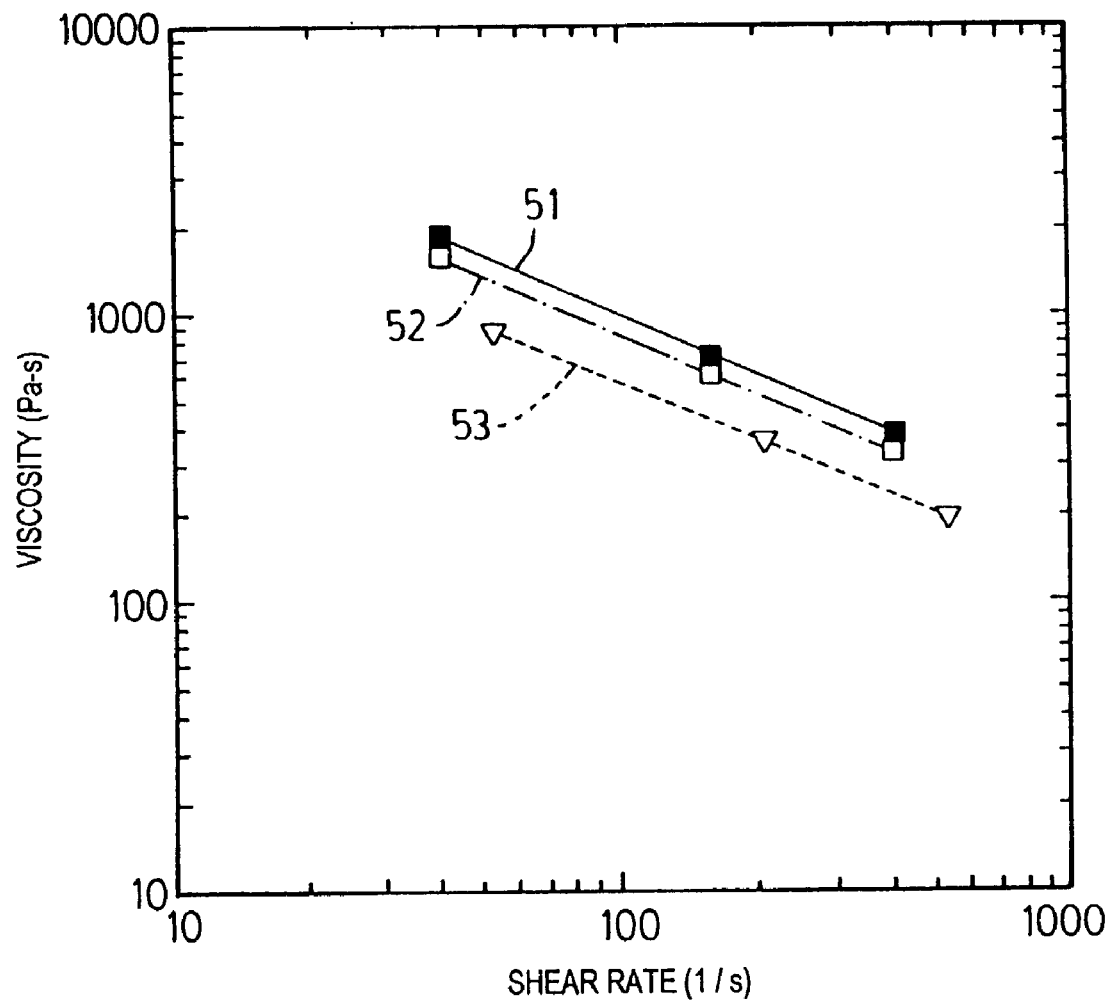
FIG. 4 is a graph of viscosity against shear rate at various extruder barrel pressures.

The viscosities of rubber/$CO_2$ mixtures were measured in the wedge die while the viscosity of the pure recycled rubber could not be measured due to its crosslinked nature. The dissolution of $CO_2$ was achieved by generating high pressure in the barrel and the wedge die, and the pressures were controlled by adjusting the opening area of the secondary die. The viscosity of rubber/2 wt % $CO_2$ mixture (weight ratio rubber: $CO_2$ of 50:1) at various barrel pressures at 242° C. is shown in FIG. 4, where curves 51, 52 and 54 are for barrel pressures of 970, 1130 and 2170 psi, respectively. As indicated, the viscosity of the mixture decreases with increasing the barrel pressure. It should be noted that increasing the pressure leads to increased dissolution of $CO_2$ which results in increasing the plasticization effect.

Figure 5:
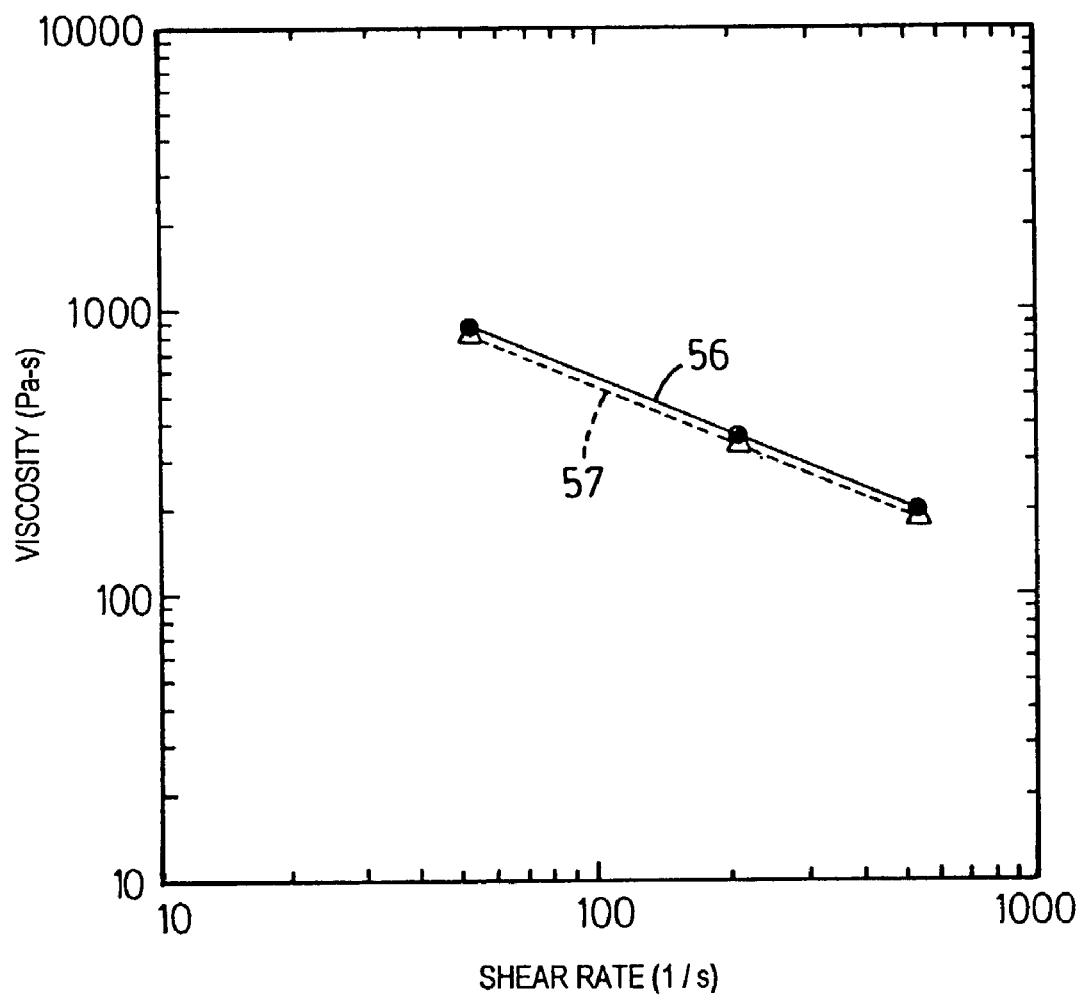
FIG. 5 is a graph of viscosity against shear rate at different $CO_2$ concentrations.

The effect of $CO_2$ concentration on the viscosity at 242° C. was also investigated as shown in FIG. 5, where curve 56 shows the viscosity for 2 wt % $CO_2$ at PB=2170 psi and curve 57 shows the viscosity for 3 wt % $CO_2$ at PB=1920 psi. The viscosity of the 3 wt % $CO_2$ mixture (weight ratio of rubber: $CO_2$ of 33.3:1) is slightly less than that of the 2 wt % $CO_2$ mixture. It should be noted, that the pressure levels are different for the two curves in FIG. 5. If the barrel pressure of 3 wt % $CO_2$ mixture is increased up to 2170 psi or over the solubility pressure, the viscosity of the 3 wt % $CO_2$ mixture would be less than that shown in FIG. 5, in the same manner shown in FIG. 4. Consequently, the viscosity or flowability of rubber/$CO_2$ is affected strongly by the concentration of $CO_2$ as well as the barrel pressure, and the required pressure level should be maintained to achieve increased flowability of the rubber/$CO_2$ mixture.

Tensile Test Results

Figure 6:
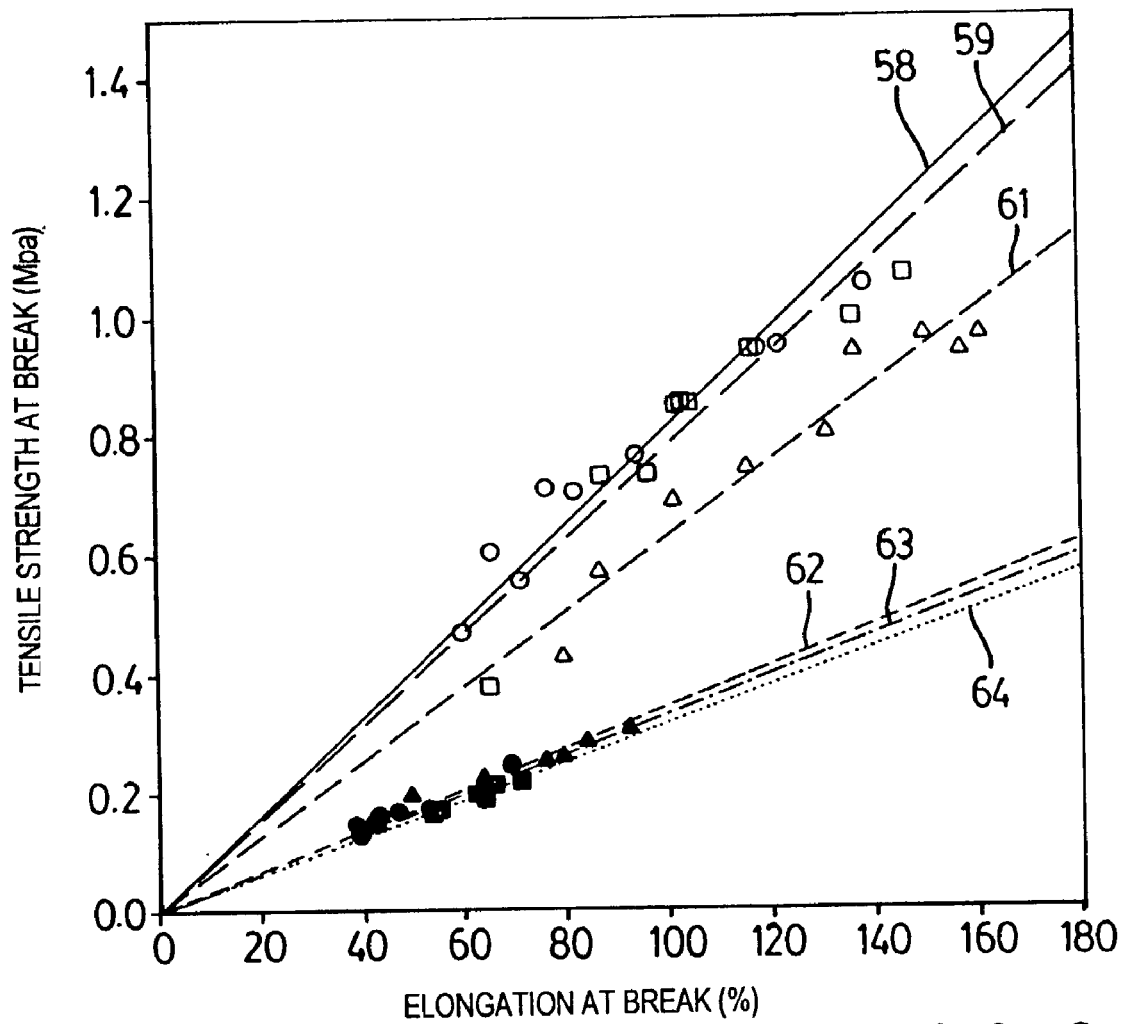
FIG. 6 is a graph of tensile strength and elongation at break for recycled rubbers prepared at various conditions.

Tensile tests were performed for the extruded rubber as well as unextruded (40–60 mesh powder) rubber. The tensile strength versus elongation curve is shown in FIG. 6.

The curves are for materials prepared under conditions as follows:

TABLE 2

| Curve No. | Material |
| --- | --- |
| 58 | unextruded, 200° C., 25000 lbs |
| 59 | unextruded, 200° C., 35000 lbs |
| 61 | unextruded, 250° C., 35000 lbs |
| 62 | extruded, 200° C., 25000 lbs |
| 63 | extruded, 200° C., 35000 lbs |
| 64 | extruded, 250° C., 35000 lbs |

Figure 7:
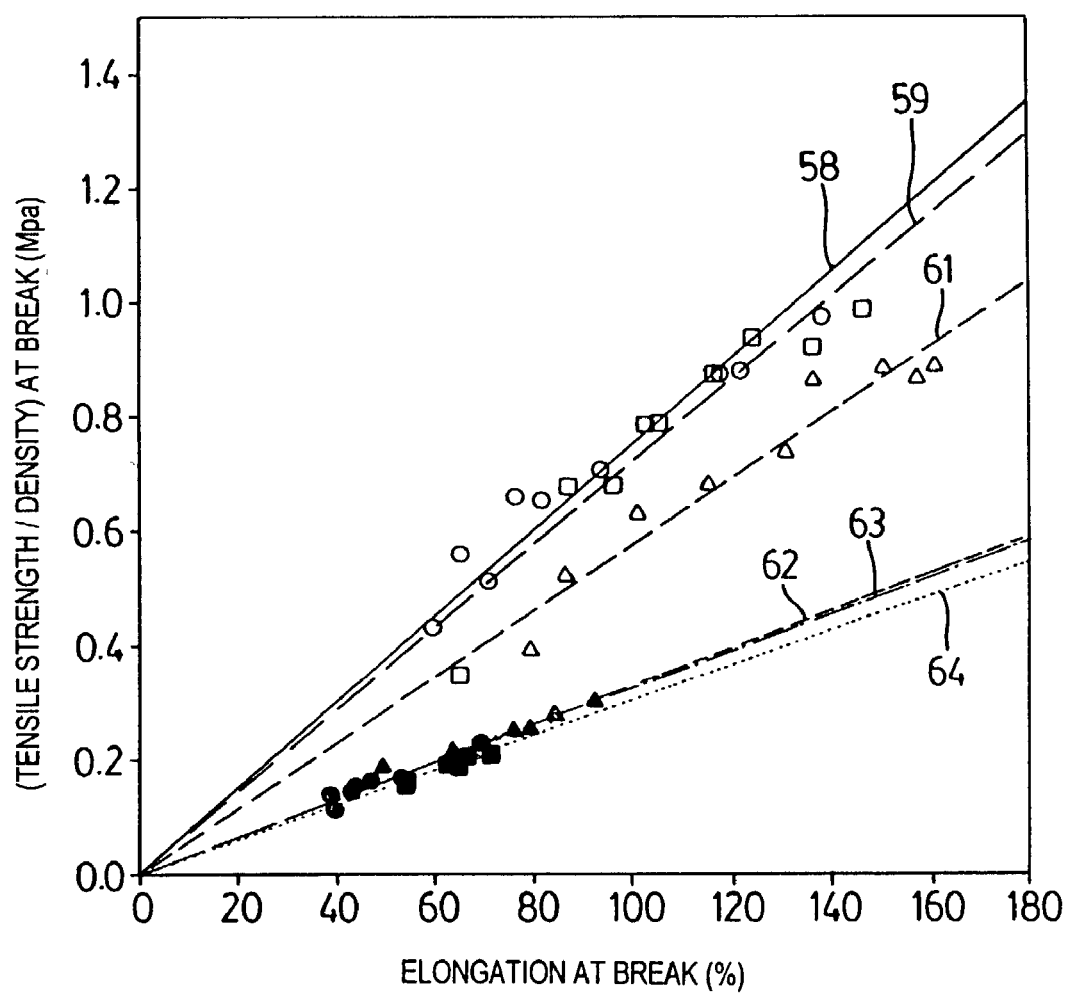
FIG. 7 is a graph of tensile strength/density and elongation at break for the recycled rubbers referred to in FIG. 6.

As clearly indicated in FIG. 6, the conditions for the specimen preparation greatly affected the tensile properties of unextruded rubber rather than of extruded rubber. It was noted that high temperature leads to decrease in the tensile modulus. The decrease in the modulus can be explained by devulcanization of rubber at high temperature. It appears that the extruded rubber in FIG. 6 has experienced some devulcanization at high temperature (about 260° C.) during extrusion. The tensile moduli of various specimens are listed in Table 3. In order to compare the tensile strength at the same level of material density, density measurements were performed for the specimens. The density was calculated by measuring the volume and weight of samples. As shown in Table 3, the densities of extruded specimens were only slightly lower than those of unextruded specimens. It would be expected that the specimens extruded in the presence of $CO_2$ would have a foamed structure. The density of foamed plastics is usually much lower than that of unfoamed plastics. In this study, however, the foamed structure was collapsed during the hot press treatment. The tensile strength divided by the density versus elongation curves for the same materials designated by the same curve numbers as in FIG. 6 are shown in FIG. 7. This graph is not different than FIG. 6, from which it can be concluded that the lower values obtained for the extruded rubber are due to partial devulcanization taking place during extrusion.

TABLE 3

Tensile Modulus for recycled rubber at various preparation conditions

| | Molding Temper-ature (° C.) | Molding Force (lbs) | Tensile Modulus (MPa) | Density (g/cm³) |
| --- | --- | --- | --- | --- |
| Unextruded | 200 | 25000 | 1.216 | 1.080 |
| Unextruded | 200 | 35000 | 1.209 | 1.081 |
| Unextruded | 250 | 35000 | 0.803 | 1.089 |
| Extruded | 200 | 25000 | 0.474 | 1.039 |
| Extruded | 200 | 35000 | 0.412 | 1.032 |
| Extruded | 250 | 35000 | 0.406 | 1.015 |

In the following Examples, devulcanization procedures were carried out using a co-rotating twin-screw extruder modified as described above with reference to FIGS. 1 to 3.

The crumb rubber materials used in the following Examples consisted of three different sizes of rubber powder of 40, 60 and 80 mesh. Table 4 shows the correspondence between mesh size and particle diameter.

TABLE 4

Mesh Size to Particle Diameter Approximate Relation

| Mesh Size | Microns | Millimeters | Inches |
| --- | --- | --- | --- |
| 40 | 425 | 0.425 | 0.0165 |
| 60 | 250 | 0.25 | 0.0098 |
| 80 | 180 | 0.18 | 0.007 |

In the following Examples, soxhlet extraction was used to evaluate the degree of devulcanization by separating the soluble fraction from the gel in the rubber samples. First, acetone was used to remove low molecular weight substances. 20 g of extrudate was placed in a thimble in the extraction tube 250 ml acetone was heated to boiling point (about 56° C.). The vapor was condensed down to the tube by the condenser with cold water circulation. The extraction was run for 5 hours. After the sample, now free of low molecular weight substances, was dried by distillation in a fume hood and weighed, 250 ml toluene was used as solvent to separate the sol from the gel in the residue by following the same procedure for 8 hours. The residue swelled in toluene and from the dried and weighed residue, the weights of sol and gel were obtained.

EXAMPLE 2

80 mesh SBR rubber was devulcanized at 250° C. using rubber feed rates, as supplied by the feeder 14, of 15 g/min and 30 g/min. The $CO_2$ concentrations were varied. The contents of low m.w. substances, sol, and total soluble (low m.w. plus sol) were obtained for the starting material SBR rubber and for the devulcanized products, and are shown in Table 4 in weight percent based on the total weight of the sample.

TABLE 4

| | Starting material | Feed rate 15 g/min $CO_2$ concentration | | | Feed rate 30 g/min $CO_2$ concentration | | |
|---|---|---|---|---|---|---|---|
| | SBR | 1% | 2% | 3% | 1% | 2% | 3% |
| Low m.w. | 6 | 9 | 8 | 9 | 9 | 9 | 8 |
| Sol | 2 | 17 | 16 | 17 | 17 | 14 | 18 |
| Total solubles | 8 | 26 | 24 | 26 | 26 | 23 | 26 |

It will be noted that extrusion with supercritical $CO_2$ resulted in an increase of the soluble fraction from 8% in the starting powder to about 26% in the devulcanized material. Also, it can be seen that changes in feed rate and $CO_2$ concentration did not have an effect on the soluble fraction in the rubber. Furthermore, it will be noted that the soluble part consists mainly of sol resulting from devulcanization (about 17%) and that the low molecular weight fraction (about 9%) is not considerably different from that of the starting material.

EXAMPLE 3

Example 2 was repeated at barrel temperatures of 200° C. and 250° C., with screw speeds of 25 and 50 rpm and 2 wt % $CO_2$. The results are shown in Table 5.

TABLE 5

| Temp. | 200° C. | | 250° C. | |
|---|---|---|---|---|
| Screw speed (rpm) | 25 | 50 | 25 | 50 |
| Low m.w. | 8 | 9 | 8 | 9 |
| Sol | 9 | 11 | 14 | 18 |
| Total solubles | 17 | 20 | 22 | 27 |

The results show that increasing screw speed leads to increased shearing and therefore increased devulcanization.

In order to study the changes in properties after devulcanization through extrusion, products were revulcanized with curing agents. Two samples were prepared using devulcanized SBR 40 mesh obtained following the procedure as described in the Examples above with 2.1 wt % $CO_2$ and 4.6 wt % $CO_2$ concentration at 250° C., 50 rpm. These samples were compounded according to the following recipe:

TABLE 6

| Ingredient | Parts by weight |
|---|---|
| Devulcanized Rubber | 100 |
| Sulphur POLYBOUND ™ 80%* | 1.2 |
| MBTS 301 POLYBOUND ™ 80%* | 0.6 |
| TMTD 304 POLYBOUND ™ 80%* | 0.6 |

The samples were milled on a Farrel Laboratory mill with size 28 cm length and 15 cm. diameter for 2–3 minutes. The nip size was 6 mm and the mill rolls start-up temperatures was 20° C. The curing agents were added and blended for another 3–4 minutes. When the compound was running, the temperature increased to 25° C. gradually and the compound became sticky and not easily removed from the mill rolls. After mixing, the matrix was molded on a 15T vantage Press with 2 cavities for 15 minutes at 330° F. for test specimen preparation. The molded specimens had a good rubbery appearance.

After compounding, the following properties were determined based on ASTM D412 method. The properties, including Mooney viscosity, tensile strength, elongation at break, modulus, and tear strength and are summarized in the Table 7.

Compared to typical rubber compounds, the physical properties of devulcanized rubber are apparently reduced. This suggests that severe devulcanization has occurred at the used extrusion conditions. However, the processing can easily be controlled and optimized, for example by reducing shear rates, to reduce the degree of devulcanization. The devulcanized rubber product obtained in accordance with the invention may be used in blends with virgin rubber as well as other thermoplastic polymers.

TABLE 7

Processing and Physical Properties of Devulcanized SBR

| Compound Parameter | Devulcanized SBR with 4.6 wt % $CO_2$ | Devulcanized SBR with 2.1 wt % $CO_2$ |
|---|---|---|
| Mooney (1 + 4, 125 C) min | 32.1 | 34.7 |
| T5 (121 C) min | 8.79 | 8.58 |
| T90 (169.8 C) min | 0.6 | 0.59 |
| MLS1 | 1.35 | 1.49 |
| MHS1 | 7.24 | 7.98 |
| Tensile MPa | 3.3 | 3.7 |
| Tensile set at break | 0.5% | 1.5% |
| Tensile set | 1.1% | 5.2% |
| Elongation % | 172% | 180% |
| Hardness Shore A | 47 | 48 |
| Modulus 100% MPa | 1.7 | 1.8 |
| Modulus 200% MPa | 3 | 2.6 |
| Modulus 300% MPa | 0.8 | |
| Tear KN/m | 10 | 10.1 |

While the above Examples have described use of carbon dioxide as the supercritical fluid, it will be appreciated that other normally gaseous fluids that can be rendered supercritical in the apparatus may be employed. Such normally gaseous fluids include but are not limited to ethane, ethene, propane, propene, xenon, nitrogen, ammonia, nitrous oxide and fluoroform.

Using procedures similar to those described above in Examples 1 to 3, other crosslinked rubber materials can be devulcanized. Such other materials include natural rubber, EPDM (ethylene-propylene diene rubbers), EPT (ethylene-propylene terpolymer rubbers), TPU (thermoplastic urethane rubbers), TPEs (thermoplastic elastomers), TPVs (thermoplastic vulcanizates), butyl rubber, nitrile rubber, polysulfide elastomers, polybutadiene, polyisoprene rubber, polyisobutylene, polyester rubbers, isoprene-butadiene copolymers, neoprene rubber, acrylic elastomers, diisocyanate-linked condensation elastomers, silicone rubbers, crosslinked polyethylene, ethylene-vinylacetate polymers, and mixtures thereof.

EXAMPLE 4

EPDM rubber 60 mesh was processed as described in the preceding Examples at barrel temperatures of 250° C. and 300° C. and at screw speeds of 25 and 50 rpm, with a feed rate of 15 g/min and 2 wt % $CO_2$ concentration. The analysis of the starting materials and of the products is shown in Table 8.

TABLE 8

| Starting material | 250° C. | | 300° C. | |
|---|---|---|---|---|
| EPDM | 25 rpm | 50 rpm | 25 rpm | 50 rpm |
| Low m.w. | 15 | 15 | 18 | 9 | 14 |
| Sol | 9 | 14 | 16 | 17 | 14 |
| Total solubles | 24 | 29 | 34 | 26 | 28 |

The effect of temperature on the devulcanization may be seen. While SBR is temperature sensitive, EPDM has very good heat resistance and displays quite different devulcanization behavior at 250° C. and 300° C. The raw EPDM powder could not be devulcanized at 200° C. Increasing temperature resulted in decreased soluble fraction and low molecular weight fraction. For instance, the soluble part at 50 rpm changed from approximately 34% at 250° C. to 28% at 300° C. Nevertheless, at 25 rpm, the sol content increased from about 14% at 250° C. to about 17% at 300° C. compared to the decrease of sol content at 50 rpm from about 16% at 250° C. to about 14% at 300° C. Therefore, excessively high temperature is unsuitable for devulcanization process of EPDM at higher screw speed, and the devulcanization can be controlled by controlling shear rates and temperature.

The invention claimed is:

1. A method of modifying crosslinked rubber comprising subjecting the rubber to mechanical elongational and shear forces in the presence of a supercritical fluid that is normally gaseous, wherein the ratio by weight of rubber to said fluid is 100:1 to 20:1.

2. Method according to claim 1 wherein the supercritical fluid is ethane, ethene, propane, propene, xenon, nitrogen, ammonia, nitrous oxide, fluoroform or carbon dioxide.

3. Method according to claim 2 wherein the supercritical fluid is carbon dioxide.

4. Method according to claim 1 wherein said supercritical fluid is at a pressure of from about 90% to about 300% of its critical pressure.

5. Method according to claim 1 wherein said supercritical fluid is at a temperature expressed in ° K of about 90% to about 300% of its critical temperature.

6. Method according to claim 1 wherein the rubber is provided in finely divided form.

7. Method according to claim 6 wherein the rubber particle size is 150 microns to 5 mm.

8. Method according to claim 7 wherein said particle size is 160 to 1000 microns.

9. Method according to claim 7 wherein said particle size is 170 to 500 microns.

10. Method according to claim 1 wherein the rubber comprises a material selected from the group consisting of natural rubber, styrene-butadiene rubber, EPDM (ethylene-propylene diene rubbers), EPT (ethylene-propylene terpolymer rubbers), TPU (thermoplastic urethane rubbers), TPEs (thermoplastic elastomers), TPVs (thermoplastic vulcanizates), butyl rubber, nitrile rubber, polysulfide elastomes, polybutadiene, polyisoprene rubber, polyisobutylene, polyester rubbers, isoprene-butadiene copolymers, neoprene rubber, acrylic elastomers, diisocyanate-linked condensation elastomers, silicone rubbers, crosslinked polyethylene, ethylene-vinylacetate polymers, and mixtures thereof.

11. Method according to claim 10 wherein the rubber comprises styrene butadiene rubber.

12. Method according to claim 10 wherein the rubber comprises EPDM rubber.

13. A method of modifying crosslinked rubber comprising subjecting the rubber to mechanical elongational and shear forces in the presence of a supercritical fluid that is normally gaseous, wherein the weight content of supercritical fluid, based on the weight of rubber, is 0.5 to 3%.

14. Method according to claim 13 wherein the supercritical fluid is ethane, ethene, propane, propene, xenon, nitrogen, ammonia, nitrous oxide, fluoroform or carbon dioxide.

15. Method according to claim 14 wherein the supercritical fluid is carbon dioxide.

16. Method according to claim 13 wherein said supercritical fluid is at a pressure of from about 90% to about 300% of its critical pressure.

17. Method according to claim 13 wherein said supercritical fluid is at a temperature expressed in ° K of about 90% to about 300% of its critical temperature.

18. Method according to claim 13 wherein the rubber is provided in finely divided form.

19. Method according to claim 18 wherein the rubber particle size is 150 microns to 5 mm.

20. Method according to claim 19 wherein said particle size is 160 to 1000 microns.

21. Method according to claim 13 wherein the rubber comprises a material selected from the group consisting of natural rubber, styrene-butadiene rubber, EPDM (ethylene-propylene diene rubbers), EPT (ethylene-propylene terpolymer rubbers), TPU (thermoplastic urethane rubbers), TPEs (thermoplastic elastomers), TPVs (thermoplastic vulcanizates), butyl rubber, nitrile rubber, polysulfide elastomes, polybutadiene, polyisoprene rubber, polyisobutylene, polyester rubbers, isoprene-butadiene copolymers, neoprene rubber, acrylic elastomers, diisocyanate-linked condensation elastomers, silicone rubbers, crosslinked polyethylene, ethylene-vinylacetate polymers, and mixtures thereof.

22. Method according to claim 21 wherein the rubber comprises styrene butadiene rubber.

23. Method according to claim 21 wherein the rubber comprises EPDM rubber.

* * * * *